Figure 1:
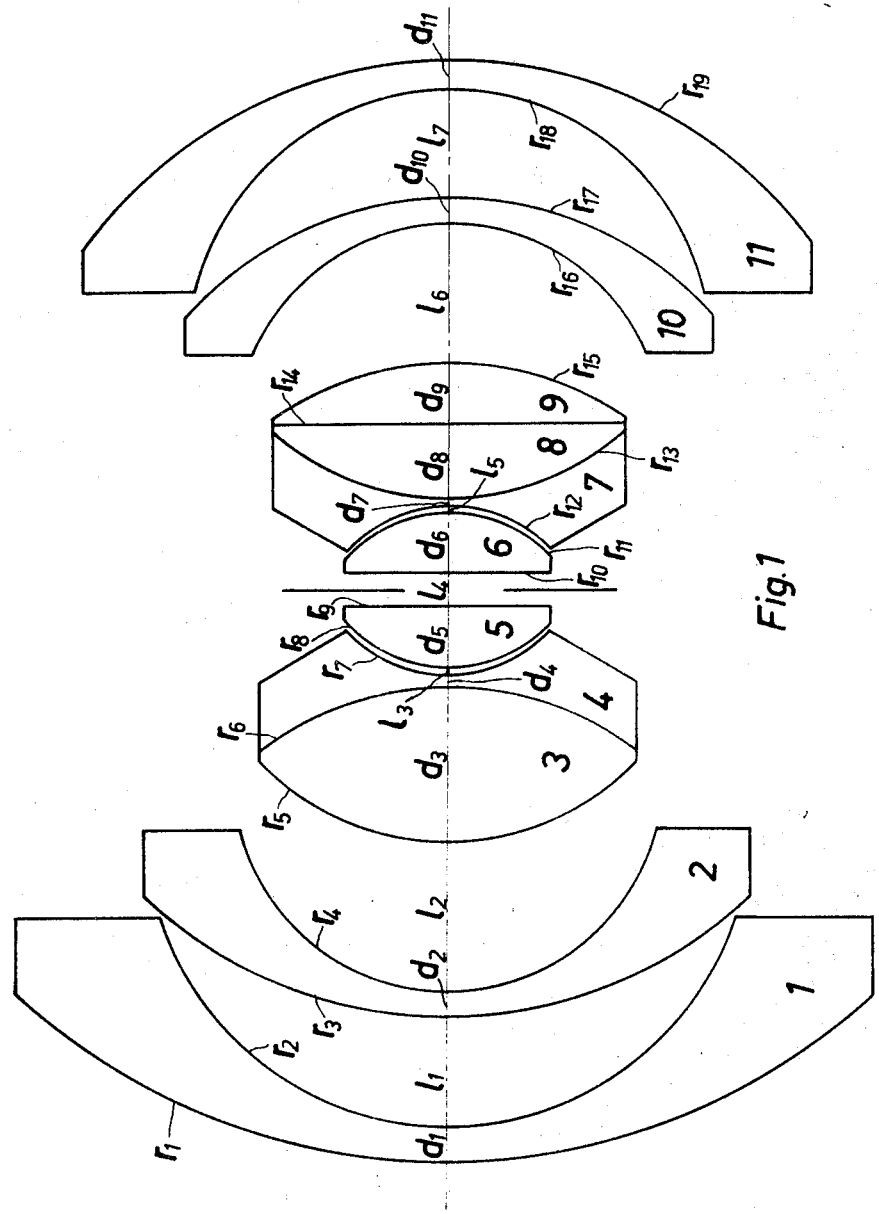

United States Patent

[11] 3,634,000

[72] Inventors Eberhard Dietzsch
Jena, District of Gera;
Ernst Rumpoldin, Apolda, District of Erfurt, both of Germany
[21] Appl. No. 824,023
[22] Filed May 6, 1969
[45] Patented Jan. 11, 1972
[73] Assignee Veb Carl Zeiss Jena
Jena, Gera, Germany

[54] WIDE-ANGLE LENS COMPRISING EIGHT COMPONENTS
2 Claims, 2 Drawing Figs.

[52] U.S. Cl. .................................... 350/214, 350/207
[51] Int. Cl. .................................... G02b 9/00, G02b 9/08
[50] Field of Search ......................... 350/207, 214, 215

[56] References Cited
UNITED STATES PATENTS
| 2,734,424 | 2/1956 | Bertele | 350/215 |
| 3,039,361 | 6/1962 | Baker | 350/215 X |
| 3,370,905 | 2/1968 | Hudson | 350/215 X |
| 2,734,423 | 2/1956 | Bertele | 350/214 |

FOREIGN PATENTS
| 466,575 | 11/1951 | Italy | 350/215 |
| 850,070 | 9/1960 | Great Britain | 350/215 |
| 183,426 | 8/1966 | U.S.S.R. | 350/215 |

Primary Examiner—David Schonberg
Assistant Examiner—Paul A. Sacher
Attorney—Nolte & Nolte ABSTRACT: A wide-angle lens comprises eight components and has a relative aperture of 1:5.6 and an angular field of at least 120°. The object side and the image side of a convergent central part of the lens are each faced by the concave sides of three divergent menisci.

WIDE-ANGLE LENS COMPRISING EIGHT COMPONENTS

This invention relates to wide-angle lenses comprising eight components and having a relative aperture of 1:5.6 and an angular field of at least 120° and wherein the object side and the image side of a convergent central part are each faced by the concave sides of three divergent menisci.

Lenses of the foregoing kind are preferably used in precision cameras for aerial photogrammetry operating with high-precision shutters.

Known lenses of this or a similar type have the disadvantage that, if the space for the diaphragm is smaller than the 0.06 times the focal length, the provision of a high-precision shutter is impossible. On the other hand, in the case where sufficient space is available an undesired vignetting effect has to be tolerated when large angular fields are concerned.

In wide-angle lenses having large angular fields—even if dispersive menisci enlarge the entrance pupil in conformity with the increase of the angle—the distribution of light in the image plane is most unfavorable owing to the light decrease towards the margin. It is imperative, therefore, to obviate further deterioration due to vignetting.

A further disadvantage of such known lenses consists in incomplete correction of the image errors in the margin of the image field. In particular, the sagittal image is not plane enough and the coma is generally bound up with considerably asymmetry errors deleterious to the quality of the image.

The present invention aims at obviating the foregoing disadvantages by providing a wide-angle lens in which the space for the diaphragm is greater than 0.06 times the entire focal length and which at a relatively aperture of 1:5.6 defines an image angle of at least 120° without vignetting, and in which the correction for astigmatism is decisively improved and substantial coma correction free from asymmetry errors is obtained in the entire image field.

To this end, the present invention consists of a eight-component wide-angle lens of the foregoing kind, characterized in that the convergent central part of the lenses comprises two convergent elements the less curved of which enclose a diaphragm and the stronger curved faces of which are each conjugate to a comparatively thick dispersive meniscus, that each of these two menisci has at least one convergent convex cemented face conjugate to the diaphragm and lies at a distance therefrom which is less than 0.015 times the entire focal length so as to provide an air space in the form of a thin convergent meniscus, and that the distance between the convex exterior faces of the two convergent elements of the central part is smaller than 0.35 times the entire focal length. The less curved faces of these two convergent elements thus include a diaphragm space large enough for a shutter.

Accordingly, and contrary to the known practice, the convergent cemented faces for the correction of the astigmatism and coma of such lenses are not located in the convergent central part, but are included in the two menisci symmetrically enclosing that part. These two menisci, which are naturally rather thick and may only be spaced the necessary short distance away from the central part, are also instrumental in the correction of the spherical aberration. The air spaces in the form of thin convergent menisci between the convergent central part and the two adjacent thick menisci enable the correction of the coma errors, which are particularly great in such lenses. Not only does a construction of the foregoing kind substantially flatten the astigmatic images and the asymmetry error but offers the additional advantage of favorable coma correction throughout the entire image field, provided that the radius difference of each of the said image field, provided that the radius difference of each of the said two meniscus-shaped air spaces is less than 0.025 and that the radii of these air spaces are within 0.22 and 0.33 times of the entire focal length.

The reduction of the comatic asymmetry error is accompanied by zone-free correction of the distortion if the radius of the outer convex surface of the thick meniscus directly on the image side of the convergent central part is numerically at least 1.1 times greater than the radius of the outer convex surface of the thick meniscus directly on the object side of the convergent central part and if, at the same time, the arithmetical mean of the refractive index of the element nearest the image and that of the element adjacent thereto is greater than 1.6.

Apart from the correction of the monochromatic image errors, importance attaches also to good chromatic correction, which, as is well known, poses some difficulty in the case of so large an image field. In particular, to keep the chromatic zonal aberration of the distortion and the chromatic coma errors within narrow limits, it is advantageous to provide that the Abbe number of the element last but one on the image side of the convergent central part is smaller than 45 and that the thick meniscus directly on the image side of the convergent central part has a further cemented surface near the cemented surface convex towards the diaphragm, the radius of this further cemented surface being numerically at least three times greater than the entire focal length, and that the refractive indices of the elements contacting each other in this further cemented surface differ by less than 0.03, the Abbe numbers of these latter elements differing from each other by at least eight units in such a manner that the element of the greater Abbe number lies on the image side of the said further cemented surface.

The useful spectral range can be increased by providing that the meniscus directly on the object side of the convergent central part has also a further chromatically active cemented surface which is concave towards the diaphragm.

Figure 2:
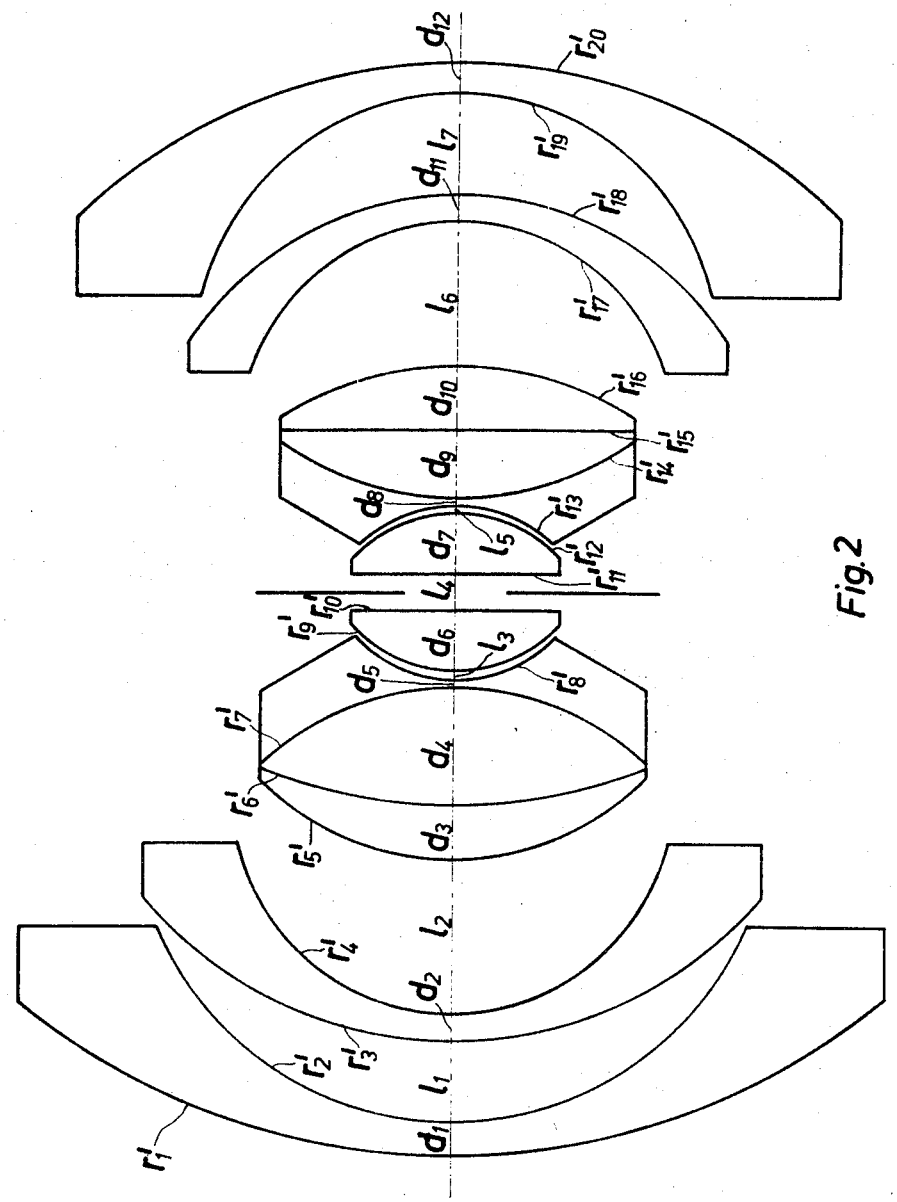

In order that the invention may be more readily understood, reference is made to the following Tables I and II and the accompanying drawing which illustrates diagrammatically and by way of example two constructional examples of the invention. Table I corresponds to FIG. 1 of the drawing. Table II corresponds to FIG. 2 of the drawing.

TABLE I

Focal length $f=1$; relative aperture 1:5.6; angular field 121°; diaphragm space $l_4=0.06181$

| Radii | Thicknesses and distances | Refractive indices $n_d$ | Abbe numbers $\nu$ |
|---|---|---|---|
| $r_1=+1.29775$ | | | |
| | $d_1=0.06828$ | 1.51633 | 64.0 |
| $r_2=+0.61125$ | | | |
| | $l_1=0.21736$ | | |
| $r_3=+0.89057$ | | | |
| | $d_2=0.05678$ | 1.51633 | 64.0 |
| $r_4=+0.43467$ | | | |
| | $l_2=0.28924$ | | |
| $r_5=+0.52622$ | | | |
| | $d_3=0.31583$ | 1.67786 | 55.5 |
| $r_6=-0.63863$ | | | |
| | $d_4=0.01869$ | 1.60562 | 43.9 |
| $r_7=+0.27184$ | | | |
| | $l_3=0.00489$ | | |
| $r_8=+0.28280$ | | | |
| | $d_5=0.12722$ | 1.55115 | 49.6 |
| $r_9=+28.73676$ | | | |
| | $l_4=0.06181$ | | |
| diaphragm space | | | |
| $r_{10}=+4.87763$ | | | |
| | $d_6=0.12794$ | 1.55361 | 51.4 |
| $r_{11}=-0.29168$ | | | |
| | $l_5=0.00331$ | | |
| $r_{12}=-0.28280$ | | | |
| | $d_7=0.01869$ | 1.61293 | 37.0 |
| $r_{13}=+0.56805$ | | | |
| | $d_8=0.15238$ | 1.66446 | 35.9 |
| $r_{14}=-5.11339$ | | | |
| | $d_9=0.11788$ | 1.67786 | 55.5 |
| $r_{15}=-0.62426$ | | | |
| | $l_6=0.27429$ | | |
| $r_{16}=-0.44284$ | | | |
| | $d_{10}=0.05247$ | 1.72825 | 28.3 |
| $r_{17}=-0.70771$ | | | |
| | $l_7=0.20744$ | | |
| $r_{18}=-0.53779$ | | | |

TABLE II

Focal length $f=1$; relative aperture 1:5.6; angular field 121°; diaphragm space $l_4=0.06209$

| Radii | Thicknesses and distances | Refractive indices $n_d$ | Abbe numbers $\nu$ |
|---|---|---|---|
| $r'_1=+1.40773$ | | | |
| | $d_1=0.06773$ | 1.52088 | 60.2 |
| $r'_2=+0.64601$ | | | |
| | $l_1=0.15506$ | | |
| $r'_3=+0.80930$ | | | |
| | $d_2=0.05644$ | 1.61272 | 58.6 |
| $r'_4=+0.44316$ | | | |
| | $l_2=0.30661$ | | |
| $r'_5=+0.53348$ | | | |
| | $d_3=0.11958$ | 1.66680 | 33.1 |
| $r'_6=+1.16220$ | | | |
| | $d_4=0.22175$ | 1.66755 | 41.9 |
| $r'_7=-0.58504$ | | | |
| | $d_5=0.01693$ | 1.61659 | 36.6 |
| $r'_8=+0.26232$ | | | |
| | $l_3=0.00815$ | | |
| $r'_9=+0.27680$ | | | |
| | $d_6=0.12996$ | 1.55232 | 63.5 |
| $r'_{10}=-7.50150$ | | | |
| | $l_4=0.06209$ | | |
| diaphragm space | | | |
| $r'_{11}=+9.08195$ | | | |
| | $d_7=0.13175$ | 1.56384 | 60.7 |
| $r'_{12}=-0.29219$ | | | |
| | $l_5=0.00264$ | | |
| $r'_{13}=-0.28565$ | | | |
| | $d_8=0.01693$ | 1.58215 | 42.0 |
| $r'_{14}=+0.57550$ | | | |
| | $d_9=0.13957$ | 1.65128 | 38.3 |
| $r'_{15}=+25.53558$ | | | |
| | $d_{10}=0.12504$ | 1.64328 | 47.8 |
| $r'_{16}=-0.66308$ | | | |
| | $l_6=0.28465$ | | |
| $r'_{17}=-0.43336$ | | | |
| | $d_{11}=0.05193$ | 1.72342 | 38.0 |
| $r'_{18}=-0.65051$ | | | |
| | $l_7=0.19993$ | | |
| $r'_{19}=-0.52868$ | | | |
| | $d_{12}=0.06435$ | 1.52944 | 51.8 |
| $r'_{20}=-1.08893$ | | | |

Although the invention has been described in considerable detail with reference to certain preferred embodiments thereof, it will be understood that variations and modifications can be effected without departing from the spirit and scope of the invention as described herein and as defined in the appended claims.

We claim:

1. A wide-angle lens comprising eight components and having a relative aperture of 1:5.6, an angular field of at least 120°, and a diaphragm space $l_4=0.06181$, the characteristics of said lens being as follows:

Focal length $f=1$; relative aperture 1:5.6; angular field 121°; diaphragm space $l_4=0.06181$

| Radii | Thicknesses and distances | Refractive indices $n_d$ | Abbe numbers $\nu$ |
|---|---|---|---|
| $r_1=+1.29775$ | | | |
| | $d_1=0.06828$ | 1.51633 | 64.0 |
| $r_2=+0.61125$ | | | |
| | $l_1=0.21736$ | | |
| $r_3=+0.89057$ | | | |
| | $d_2=0.05678$ | 1.51633 | 64.0 |
| $r_4=+0.43467$ | | | |
| | $l_2=0.28924$ | | |
| $r_5=+0.52622$ | | | |
| | $d_3=0.31583$ | 1.67786 | 55.5 |
| $r_6=-0.63863$ | | | |
| | $d_4=0.01869$ | 1.60562 | 43.9 |
| $r_7=+0.27184$ | | | |
| | $l_3=0.00489$ | | |
| $r_8=+0.28280$ | | | |
| | $d_5=0.12722$ | 1.55115 | 49.6 |
| $r_9=+28.73676$ | | | |
| | $l_4=0.06181$ | | |
| diaphragm space | | | |
| $r_{10}=+4.87763$ | | | |
| | $d_6=0.12794$ | 1.55361 | 51.4 |
| $r_{11}=-0.29168$ | | | |
| | $l_5=0.00331$ | | |
| $r_{12}=-0.28280$ | | | |
| | $d_7=0.01869$ | 1.61293 | 37.0 |
| $r_{13}=+0.56805$ | | | |
| | $d_8=0.15238$ | 1.66446 | 35.9 |
| $r_{14}=-5.11339$ | | | |
| | $d_9=0.11788$ | 1.67786 | 55.5 |
| $r_{15}=-0.62426$ | | | |
| | $l_6=0.27429$ | | |
| $r_{16}=-0.44284$ | | | |
| | $d_{10}=0.05247$ | 1.72825 | 28.3 |
| $r_{17}=-0.70771$ | | | |
| | $l_7=0.20744$ | | |
| $r_{18}=-0.53779$ | | | |
| | $d_{11}=0.06397$ | 1.58913 | 61.2 |
| $r_{19}=-0.90718$ | | | |

2. Wide-angle lens comprising eight components and having a relative aperture of 1:5.6, an angular field of at least 120°, and a diaphragm space $l_4=0.06209$, the characteristics of said lens being as follows:

Focal length $f=1$; relative aperture 1:5.6; angular field 121°; diaphragm space $l_4=0.06209$

| Radii | Thicknesses and distances | Refractive indices $n_d$ | Abbe numbers $\nu$ |
|---|---|---|---|
| $r'_1=+1.40773$ | | | |
| | $d_1=0.06773$ | 1.52088 | 60.2 |
| $r'_2=+0.64601$ | | | |
| | $l_1=0.15506$ | | |
| $r'_3=+0.80930$ | | | |
| | $d_2=0.05644$ | 1.61272 | 58.6 |
| $r'_4=+0.44316$ | | | |
| | $l_2=0.30661$ | | |
| $r'_5=+0.53348$ | | | |
| | $d_3=0.11958$ | 1.66680 | 33.1 |
| $r'_6=+1.16220$ | | | |
| | $d_4=0.22175$ | 1.66755 | 41.9 |
| $r'_7=-0.58504$ | | | |
| | $d_5=0.01693$ | 1.61659 | 36.6 |
| $r'_8=+0.26232$ | | | |
| | $l_3=0.00815$ | | |
| $r'_9=+0.27680$ | | | |
| | $d_6=0.12996$ | 1.55232 | 63.5 |
| $r'_{10}=-7.50150$ | | | |
| | $l_4=0.06209$ | | |
| diaphragm space | | | |
| $r'_{11}=+9.08195$ | | | |
| | $d_7=0.13175$ | 1.56384 | 60.7 |
| $r'_{12}=-0.29219$ | | | |
| | $l_5=0.00264$ | | |
| $r'_{13}=-0.28565$ | | | |
| | $d_8=0.01693$ | 1.58215 | 42.0 |
| $r'_{14}=+0.57550$ | | | |
| | $d_9=0.13957$ | 1.65128 | 38.3 |
| $r'_{15}=+25.53558$ | | | |
| | $d_{10}=0.12504$ | 1.64328 | 47.8 |
| $r'_{16}=-0.66308$ | | | |
| | $l_6=0.28465$ | | |
| $r'_{17}=-0.43336$ | | | |
| | $d_{11}=0.05193$ | 1.72342 | 38.0 |
| $r'_{18}=-0.65051$ | | | |
| | $l_7=0.19993$ | | |
| $r'_{19}=-0.52868$ | | | |
| | $d_{12}=0.06435$ | 1.52944 | 51.8 |
| $r'_{20}=-1.08893$ | | | |

* * * * *